(12) United States Patent
De Man et al.

(10) Patent No.: US 7,203,267 B2
(45) Date of Patent: Apr. 10, 2007

(54) SYSTEM AND METHOD FOR BOUNDARY ESTIMATION USING CT METROLOGY

(75) Inventors: Bruno Kristiaan Bernard De Man, Clifton Park, NY (US); Samit Kumar Basu, Niskayuna, NY (US); Jong Chul Ye, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 326 days.

(21) Appl. No.: 10/880,875

(22) Filed: Jun. 30, 2004

(65) Prior Publication Data

US 2006/0002504 A1    Jan. 5, 2006

(51) Int. Cl.
    *G01N 23/00*    (2006.01)
(52) U.S. Cl. .......................................................... 378/4
(58) Field of Classification Search ............... 378/4, 378/382
    See application file for complete search history.

(56) References Cited

U.S. PATENT DOCUMENTS

| | | | |
|---|---|---|---|
| 5,909,476 A | 6/1999 | Cheng et al. ................. 378/4 |
| 6,341,153 B1 | 1/2002 | Rivera et al. ................ 378/4 |
| 6,377,654 B1 | 4/2002 | Willems et al. .............. 378/59 |
| 6,421,409 B1 | 7/2002 | Paulus et al. ................ 378/4 |
| 6,567,497 B2 | 5/2003 | Reim .......................... 378/62 |
| 6,618,689 B2 | 9/2003 | Knorpp et al. ............... 702/170 |
| 2003/0185339 A1 | 10/2003 | Heumann et al. ............ 378/19 |
| 2005/0105693 A1* | 5/2005 | Zhao et al. .................. 378/210 |

FOREIGN PATENT DOCUMENTS

WO    WO2004010162    1/2004

OTHER PUBLICATIONS

Bruandet, J.-P.; Francoise, P.; Dinten, J.-M.; Michel, B.; "3D tomographic reconstruction of binary images from cone beam projections: a fast level set approach"; Biomedical Imaging, 2002. Proceedings. 2002 IEEE International Symposium on, Jul. 7-10, 2002; pp. 677-680.

Oliver Dorn; A shape reconstruction method for diffuse optical tomography using a transport model and level sets; Biomedical Imaging, 2002. Proceedings. 2002 IEEE International Symposium on, Jul. 7-10, 2002; pp. 1015-1018.

(Continued)

Primary Examiner—Courtney Thomas
Assistant Examiner—Alexander Taningco
(74) Attorney, Agent, or Firm—Fletcher Yoder

(57) ABSTRACT

A technique is provided for CT reconstruction for use in CT metrology. The boundary based CT reconstruction method includes the steps of initializing a boundary of an object to obtain a boundary estimate, defining a forward model based on the boundary estimate, linearizing the forward model to obtain a system matrix and implementing an iterative image reconstruction process using the system matrix to update the boundary estimate.

62 Claims, 4 Drawing Sheets

OTHER PUBLICATIONS

Yonggang Shi; Karl, W.C.; Castanon, D.A.; "Dynamic tomography using curve evolution with spatial-temporal regularization"; Image Processing. 2002. Proceedings. 2002 International Conference on, Sep. 22-25, 2002; vol. 2; pp. II-629-II-632.

Haihua Feng; Karl, W.C.; Castanon, D.A.; "A curve evolution approach to object-based tomographic reconstruction"; Image Processing, IEEE Transactions on, Jan. 2003; vol. 12, Issue: 1, pp. 44-57.

Yibin Zheng; Doerschuk, P.C.; "3-D image reconstruction from averaged Fourier transform magnitude by parameter estimation"; Image Processing, IEEE Transactions on, Nov. 1998; vol. 7, Issue: 11; pp. 1561-1570.

A Kirsch; "The domain derivative and two applications in inverse scattering theory"; Inverse Problems 9 (1993); Printed in the UK; IOP Publishing Ltd; pp. 81-96.

Schmid, N.A.; Bresler, Y.; Moulin, P.; "Complexity regularized shape estimation from noisy Fourier data"; Image Processing. 2002. Proceedings. 2002 International Conference on, Sep. 22-25, 2002; vol. 2 , pp. II-453-II-456.

Soussen, C.; Mohammad-Djafari, A.; "Closed surface reconstruction in X-ray tomography"; Image Processing, 2001. Proceedings. 2001 International Conference on, Oct. 7-10, 2001; vol. 1 , pp. 718-721.

* cited by examiner

SYSTEM AND METHOD FOR BOUNDARY ESTIMATION USING CT METROLOGY

BACKGROUND

The present invention relates generally to the field of non-invasive imaging and more specifically to the field of computed tomography (CT) imaging and inspection systems. In particular, the present invention relates to boundary-based CT reconstruction techniques for use in CT metrology.

Various types of measurement systems such as computed tomography (CT), coordinate measuring machines (CMM), laser-based profilometry, light gauge, infrared and others are used in industrial inspection processes for a wide variety of applications, such as for measuring wall thickness or for identifying defects in manufactured parts. Each measurement/inspection system has advantages and disadvantages. Modalities such as CMM and laser-based profilometry typically measure external surfaces with high accuracy, but cannot measure internal features unless the object is cut open. To date, CT is the most versatile of the measurement/inspection systems for revealing both the internal and external structures of industrial parts in a non-destructive manner. Because of their ability to provide internal as well as external measurements, CT based techniques may facilitate processes such as reverse engineering, rapid prototyping, casting simulation & validation, tire development, first article inspection, ceramic porosity inspection, process validation, parts qualification and defect detection, as well as others. However, CT based techniques may also have a relatively low inspection accuracy, which may deter their widespread use.

For example, in the area of reverse engineering, CT may be unsatisfactory for capturing detailed external surface features, which may be crucial for capturing the design intent. Factors affecting CT accuracy in this regard include beam-hardening, partial volume effect, scattering and off-focal radiation, as well as others. Thus, in order to improve CT inspection accuracy, more effective methods are needed for removing artifacts such as these.

These types of artifacts may arise for a variety of reasons, including the type of CT reconstruction process employed. For example, filtered backprojection (FBP) is a common technique for reconstructing CT images because of its fast computation and ease of implementation. However, because FBP is based on an oversimplification of the CT data acquisition into an ideal mathematical transform such as parallel beam Radon transform, Fan Beam transform, cone beam transform or other geometric line integral transform depending on the particular acquisition geometry, the reconstructed image may suffer from artifacts such as beam hardening and partial volume as discussed above, contributing to degraded image quality and inspection accuracy. Furthermore, pre-correction of the data prior to performing an FBP reconstruction may provide full correction of the associated artifacts.

Iterative CT image reconstruction addresses some of these image quality issues. These techniques may be based on different mathematical principles, such as the statistical approach of maximum likelihood or the least squares approach, for example. Iterative methods allow incorporation of a dedicated forward model of the data acquisition and physics of the CT scan in the reconstruction algorithm and iteratively determine the image, thereby improving the accuracy. However, iterative reconstruction approaches may be computationally inefficient, typically having long computation times due to their intensive computational requirements. Furthermore, both FBP techniques and iterative reconstruction techniques may have limited accuracy due to their reliance on pixel grid representations and/or image segmentation.

It is therefore desirable to provide an improved inspection method that accurately captures both the internal and external features of an object to be inspected in an inexpensive manner that is computationally efficient and time efficient.

BRIEF DESCRIPTION

Briefly in accordance with one aspect of the technique, a method is provided for CT reconstruction. The method provides for initializing a boundary of an object to obtain a boundary estimate, defining a forward model based on the boundary estimate, linearizing the forward model to obtain a system matrix, and implementing an iterative image reconstruction process using the system matrix to update the boundary estimate. Systems and computer programs that afford functionality of the type defined by this method may be provided by the present technique.

In accordance with another aspect of the technique, a method is provided for CT reconstruction. The method provides for generating a boundary estimate of an object from a measured sinogram, updating a system matrix based upon the boundary estimate, generating a partially calculated sinogram based on the boundary estimate, calculating at least one sinogram perturbation from at least one of the system matrix and a set of boundary perturbations, adding the partially calculated sinogram and the at least one sinogram perturbations to derive a total calculated sinogram, updating the set of boundary perturbations based upon at least one of the measured sinogram, the total calculated sinogram, and the system matrix, and updating the boundary estimate based upon the set of boundary perturbations. Systems and computer programs that afford functionality of the type defined by this method may be provided by the present technique.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques are generally directed to computed tomography (CT) reconstruction method resulting in improved inspection accuracy. Such reconstruction techniques may be useful in a variety of imaging contexts, such as CT imaging and inspection systems, CT metrology or others. Though the present discussion provides examples in a industrial imaging context, one of ordinary skill in the art will readily apprehend that the application of these techniques in other contexts, such as for medical imaging, security screening, and/or baggage or package inspection, is well within the scope of the present techniques.

Figure 1:
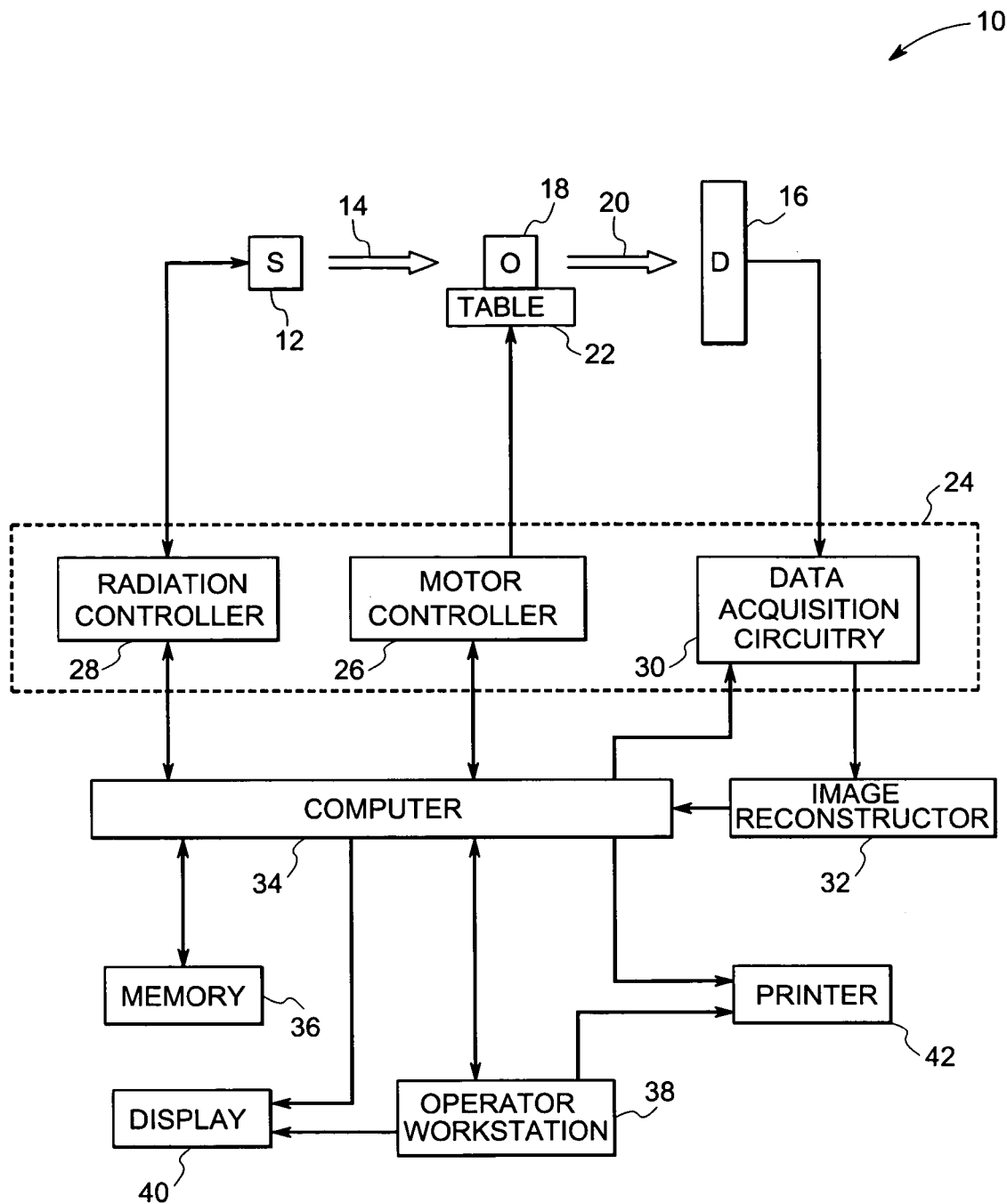
FIG. 1 depicts an exemplary CT metrology system for non-destructive evaluation and metrology of objects in accordance with one aspect of the present technique.

Referring now to FIG. 1, an imaging system 10 for use in accordance with the present technique is illustrated. In the illustrated embodiment, the imaging system 10 is a computed tomography (CT) system designed both to acquire original image data and to process the image data for display and analysis in accordance with the present technique. In the illustrated embodiment, the imaging system 10 includes a radiation source 12, such as an X-ray source. A collimator may be positioned adjacent to the radiation source 12 for regulating the size and shape of the stream of radiation 14 that emerges from the radiation source 12.

In typical operation, the radiation source 12 projects a stream of radiation 14, such as an X-ray beam, towards a detector array 16 placed on the opposite side of the radiation source 12. The stream of radiation 14 passes into a particular region in which an object 18, such as a turbine blade or other item to be imaged may be positioned. It should be noted that a particular region of the object 18 may be chosen by an operator for imaging so that the most useful scan of a region may be acquired.

A portion of the radiation 20 passes through or around the subject and impacts the detector array 16. The detector array 16 may be a single slice detector or a multi-slice detector and is generally formed by a plurality of detection elements. In one implementation, the detector array 16 may be a flat-panel detector formed as rows and columns of detector elements that may be individually read out. Each detector element produces an electrical signal that represents the intensity of the incident radiation 20 at the detector element when the radiation 20 strikes the detector array 16. These signals are acquired and processed to reconstruct an image of the features internal as well external to the object 18.

In one implementation, the object 18 is placed on a table 22, such as a turntable. The table 22 may be adapted so that the object 18 may be rotated during the examination process to expose all sides of the object 18 to the stream of radiation 14. Alternatively, the radiation source 12 and the detector array 16 may be disposed on a gantry, which may be rotated around the object 18 during the examination process. As the object 18 and the radiation source 12 rotate relative to each other, the detector array 16 collects data of radiation attenuation at the various view angles relative to the object 18. Data collected from the detector array 16 then undergoes pre-processing and calibration to condition the data to represent the line integrals of the attenuation coefficients of the scanned objects 18. The processed data, commonly called projections, are then filtered and backprojected to formulate an image of the scanned area. Thus, an image or slice is acquired which may incorporate, in certain modes, less or more than 0.360 degrees of projection data, to formulate an image.

Operation of the source 12, the table 22, and in some cases the gantry are controlled by a system controller 24, which furnishes both power, and control signals for CT examination sequences. Moreover, the detector array 16 is coupled to the system controller 24, which commands acquisition of the signals generated in the detector array 16. The system controller 24 may also execute various signal processing and filtration functions, such as for initial adjustment of dynamic ranges, interleaving of digital image data, and so forth. In general, system controller 24 commands operation of the imaging system 10 to execute examination protocols and to process acquired data. In the present context, system controller 24 may also include signal processing circuitry and other circuitry, typically based upon a general purpose or application-specific digital computer 34, associated memory circuitry for storing programs and routines executed by the computer 34, as well as configuration parameters and image data, interface circuits, and so forth. Indeed, the system controller 24 may be implemented as hardware and software components of the depicted computer 34.

In the embodiment illustrated in FIG. 1, the system controller 24 is coupled to the table 22. In particular, the system controller 24 may include a table motor controller 26 that controls the operation of the motorized table 22. In this manner, the table motor controller 26 may rotate the table 22, thereby rotating the object 18 one or multiple turns during an examination. Additionally, the radiation source 12 may be controlled by a radiation controller 28 disposed within the system controller 24. Particularly, the radiation controller 28 may be configured to provide power and timing signals to the radiation source 12. In one implementation, the system controller 24 may also include a gantry motor controller that controls the rotational speed and position of a gantry.

Further, the system controller 24 may include data acquisition circuitry 30. In this exemplary embodiment, the detector array 16 is coupled to the system controller 24, and more particularly to the data acquisition circuitry 30. The data acquisition circuitry 30 typically receives sampled analog signals from the detector array 16 and converts the data to digital signals for subsequent processing. An image reconstructor 32 that is coupled to or part of the computer 34 may receive sampled and digitized data from the data acquisition circuitry 30 and may perform high-speed image reconstruction in accordance with aspects of the present technique. Alternatively, reconstruction of the image may be done by general or special purpose circuitry of the computer 34. Once reconstructed, the image produced by the imaging system 10 reveals internal as well as external features of the object 18.

The computer 34 may include or be in communication with a memory 36. It should be understood that any type of memory to store a large amount of data may be utilized by such an exemplary imaging system 10. In addition, the computer 34 may be configured to receive commands and scanning parameters from an operator via an operator workstation 38. For example, the operator workstation 38 may be equipped with a keyboard and/or other input devices by which an operator may control the imaging system 10. Thus, the operator may observe the reconstructed image and other data relevant to the system from computer 34, initiate imaging, and so forth.

A display 40 may be coupled to one of the operator workstation 38 and the computer 34 and may be utilized to observe the reconstructed image and to control imaging. Additionally, the scanned image may also be printed on to a printer 42 which may be coupled to the computer 34 and/or the operator workstation 38, either directly or over a network. It should be further noted that the computer 34 and/or operator workstation 38 may be coupled to other output devices that may include standard or special purpose computer monitors and associated processing circuitry. Furthermore, additional operator workstations 38 may be further linked in the imaging system 10 for outputting system parameters, requesting inspection, viewing images, and so forth, so that more than one operator may perform operations related to the imaging system 10. For example, one operator may utilize one operator workstation 38 to image acquisition while a second operator utilizes a second operator workstation to reconstruct and/or review the results of the imaging routines. In general, displays, printers, workstations, and similar devices supplied within the imaging system 10 may be local to the data acquisition components, or may be remote from these components linked to the imaging system 10 via one or more configurable networks, such as the Internet, virtual private networks, and so forth.

The exemplary imaging system 10 may acquire and reconstruct image data by the techniques discussed herein, such as by a boundary based image reconstruction technique. In particular, as will be appreciated by those of ordinary skill in the art, control logic and/or automated routines for performing the techniques and steps described herein may be implemented by the imaging system 10 of FIG. 1, either by hardware, software, or combinations of hardware and software. For example, suitable code may be accessed and executed by the computer 34 to perform some or all of the techniques described herein. Similarly application specific integrated circuits (ASICs) configured to perform some or all of the techniques described herein may be included in the computer 34, the system controller 24, and/or the image reconstructor 32.

Figure 2:
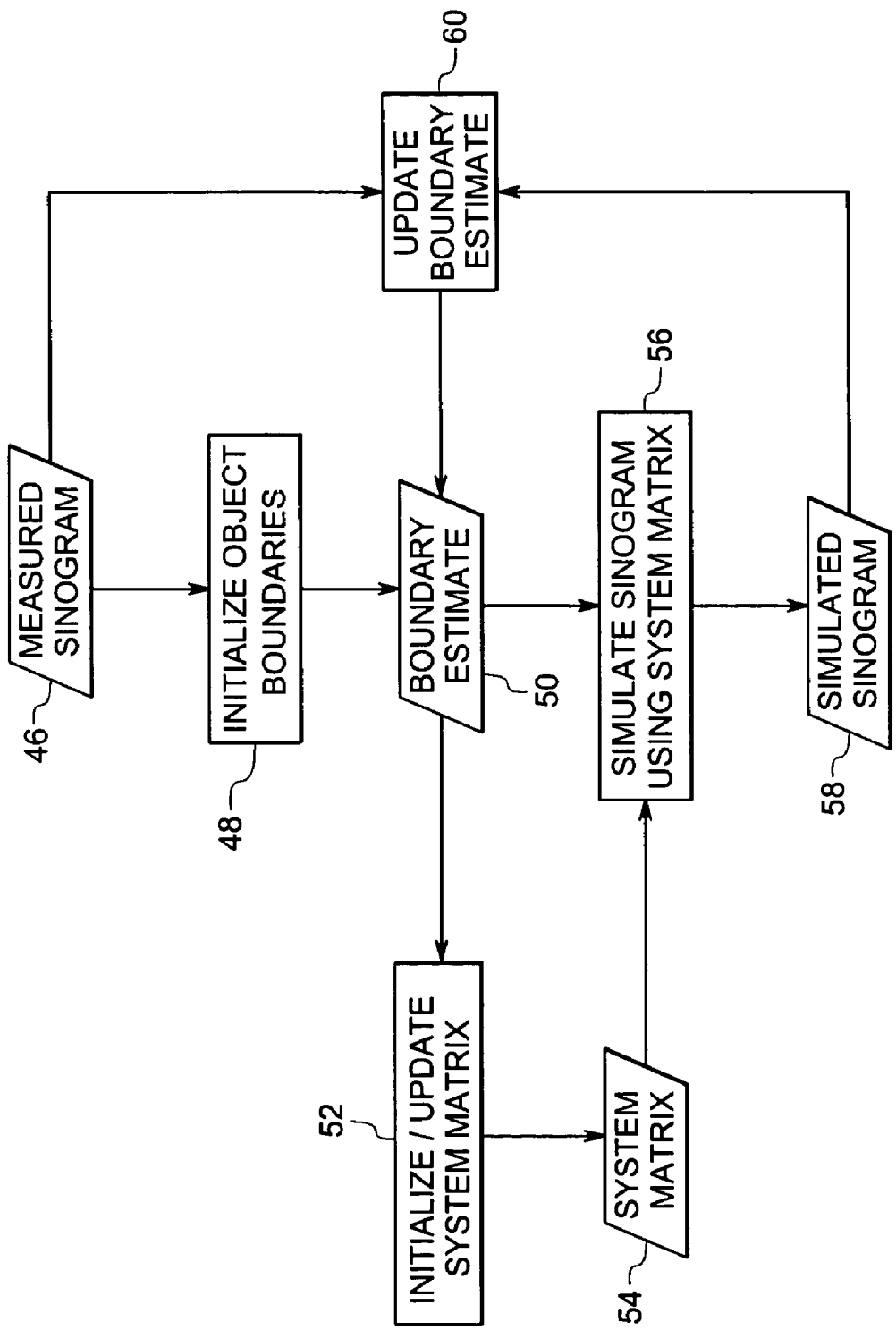
FIG. 2 is a flowchart illustrating an exemplary boundary based iterative reconstruction process in accordance with one aspect of the present technique.

For example, referring now to FIG. 2, exemplary control logic for generating boundaries using a boundary based image reconstruction techniques on a system such as imaging system 10 is depicted. As illustrated in the flowchart, a boundary estimate 50 may be initially derived from a variety of sources, such as a pixel-based reconstruction based on a measured sinogram 46, as depicted in FIG. 2. Other techniques may also be employed to initially derive the initial boundary estimate 50, such as techniques utilizing one or more contours from neighboring slices, one or more contours from a previous reconstruction, a computer aided design/drafting (CAD) model, an image obtained from one or more non-CT imaging modalities or any other prior knowledge about the imaged object. In instances where a pixel-based reconstruction is employed to initially derive the boundary estimate 50, the reconstruction may be generated by a suitable reconstruction technique, such as filtered back projection (FBP), iterative filtered back projection (IFBP), iterative reconstruction and/or statistical reconstruction techniques. In instances where non-CT imaging modalities are used to initially derive the boundary estimate 50, modalities such as a coordinate measuring machine (CMM), a micrometer, or a laser-based measurement system may be employed to initialize the outer boundaries. When such measurement systems are employed, initial estimates for the internal boundaries may be provided from the previous reconstruction or the CAD model.

The object boundaries initialized at step 48 (derived from the measured sinogram 46, as depicted, or by another technique, as described above) may constitute an initial estimate of the contours or object boundaries associated with the object 18. In particular, the identified boundaries may represent regions of substantially uniform attenuation (presumably due to uniform density or composition) within the object 18. In the depicted example, the boundaries identified in the measured sinogram 46 may be used to establish an initial boundary estimate 50 representing the presumed location of the boundaries within the object. The scanner geometry and the boundary estimate 50 may in turn be used to define a parametric model or a forward model for the identified boundaries. The forward model may be used to initialize a system matrix 54 at step 52. In one embodiment of the present technique, initializing the system matrix 54 involves linearizing the forward model with respect to the boundary estimate 50 and assumes that updates on the boundary estimates are relatively small. The system matrix 54 may then be used in any iterative reconstruction process along with the boundary estimate 50 to simulate a sinogram at step 56. The simulated sinogram 58 obtained at step 56 may be used, along with the measured sinogram 46, to update the boundary estimate 50 at step 60. If desired, the process may be repeated for a desired number of iterations or until a termination condition is met. Alternatively, once the system matrix is found by linearizing the forward model with respect to the current boundary estimate, an optimal perturbation of the boundary may be found directly by solving a suitably chosen set of linear equations. The process of linearization and linear solution can then be repeated for a desired number of iterations or until a termination condition is met.

Figure 3:
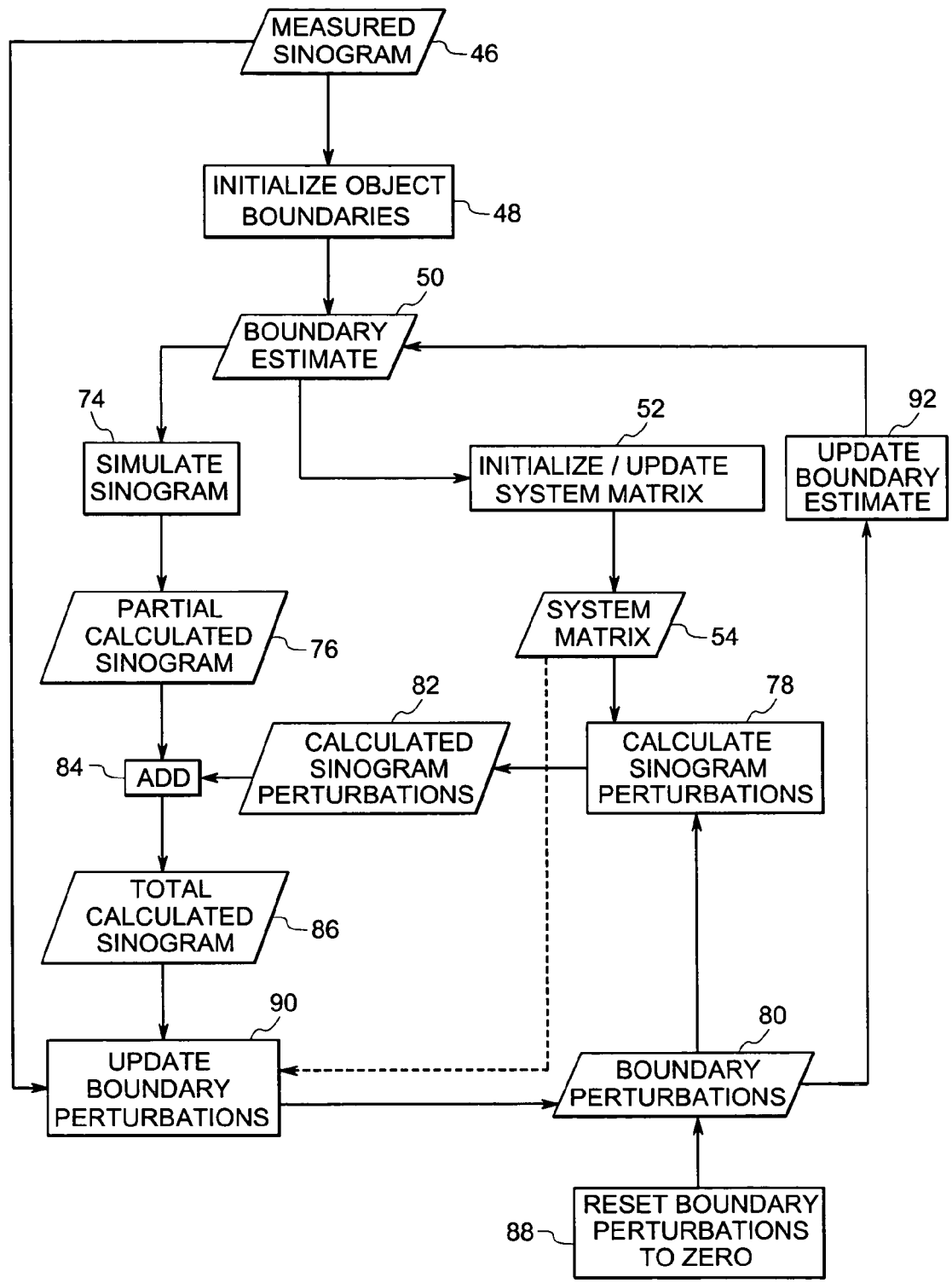
FIG. 3 is a flowchart illustrating the exemplary process of FIG. 2, in greater detail and in accordance with one aspect of the present technique.

By means of further example, the boundary based reconstruction technique illustrated in FIG. 2 may further be elaborated as shown in FIG. 3. In the illustrated control logic set forth in FIG. 3, a measured sinogram 46 may be employed to initialize one or more object boundaries at step 48, to obtain an initial boundary estimate 50 as discussed above. The boundary estimate 50 may be used to linearize the forward model at step 52 to initialize a system matrix 54. The boundary estimate 50 may also be used to simulate a sinogram at step 74 to obtain a partial calculated sinogram 76. Further, one or more sinogram perturbations 82 may be calculated at step 78 from at least one of the system matrix 54 and a set of boundary perturbations 80. As will be appreciated by those of ordinary skill in the art, initially (i.e., in the first iteration) the boundary perturbations will be zero or some other preset value, as indicated at step 88.

The one or more sinogram perturbation 82 obtained at step 78 may be added to the partial calculated sinogram 76 at step 84 to derive a total calculated sinogram 86. The set of boundary perturbations 80 may be updated at step 90 based upon the measured sinogram 46, the total calculated sinogram 86, and/or the system matrix 54. In one implementation, the set of boundary perturbations 80 are constrained for one or more parts of the boundary. The boundary estimate 50 may be updated at step 92 based upon the set of updated boundary perturbations 80. The process may be repeated for a desired number of iterations or until termination condition is met.

Figure 4:
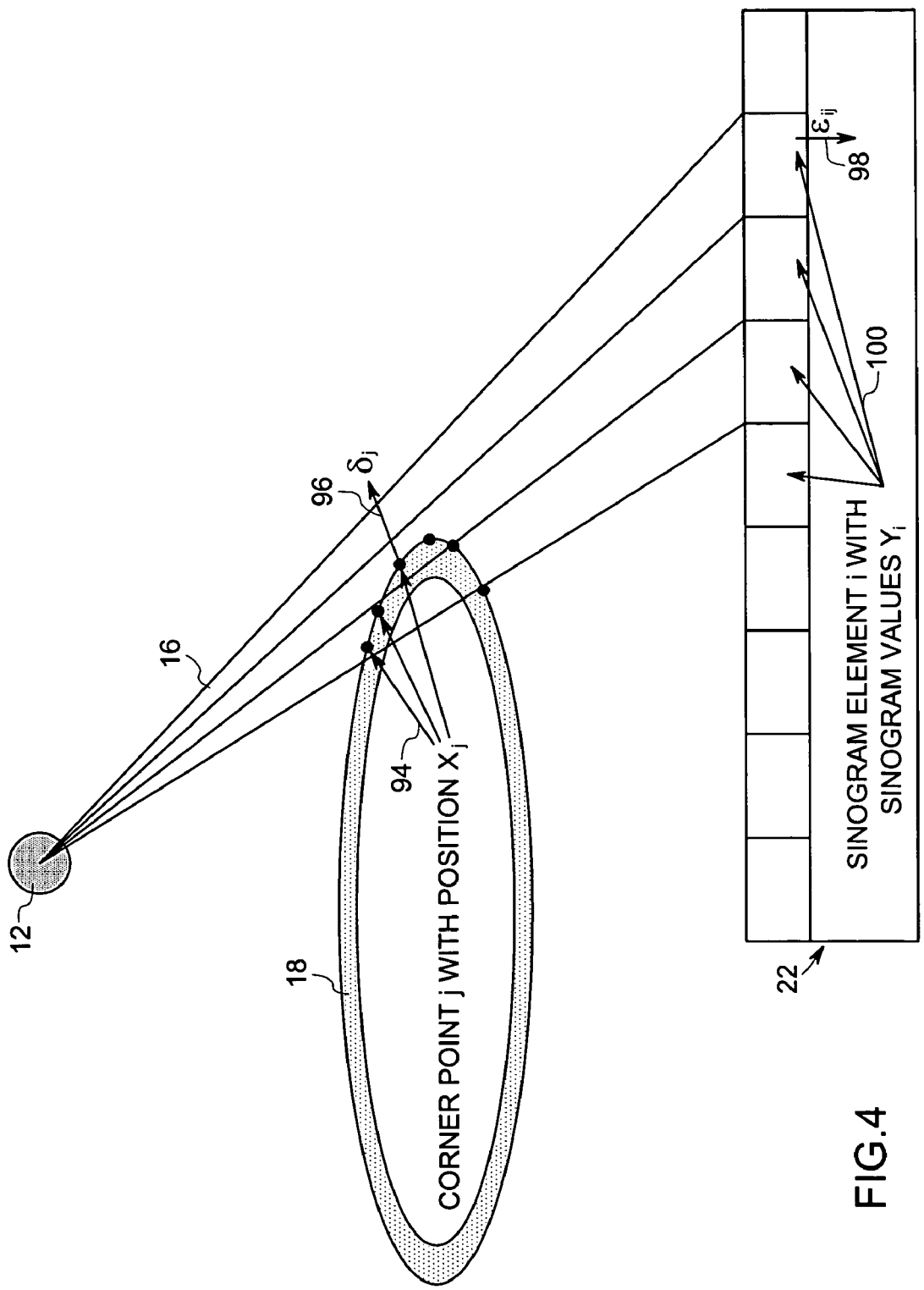
FIG. 4 depicts a process of linearization to obtain a system matrix in accordance with one aspect of the present technique.

The step of linearizing the forward model as described above with reference to FIG. 2 and FIG. 3 is further illustrated in FIG. 4. As illustrated, for each corner point j with position $X_j$ 94 of the object 18 an infinitesimal increment $\delta_j$ in the normal direction 96 may be defined, and the corresponding response $\epsilon_{ij}$ 98 in the sinogram element i with sinogram value $Y_i$ 100 may then be calculated for all projection lines that are used in the forward model. Repeating this for all parameters (corner points 94) results in the linearized system matrix, $A=\{a_{ij}\}$ where $a_{ij}=\epsilon_{ij}/\delta_j$, such as a Jacobian matrix with respect to all parameters. For other parameterizations, such as splines, the system matrix may be derived via a similar procedure using a shape derivative or domain derivative.

In the techniques described above with reference to FIG. 2 and FIG. 3, the boundary estimate 50 may be represented directly or indirectly. For example, the boundary estimate 50 may be represented indirectly by using level sets. Conversely, in direct representation, the boundary estimate 50 may be represented using one or more splines. In a specific example, the boundary estimate 50 may be represented as a piecewise linear contour represented by the respective corner points, such as corner points 94 of FIG. 4. In another example, the boundary estimate 50 may be represented using second or higher order splines. Alternatively, the boundary estimate may be defined parametrically and may be represented by a weighted sum of a plurality of basis functions. For example, the plurality of basis functions may include harmonic decompositions, wavelet decompositions, or polynomial expansions.

In embodiments where the boundary estimate 50 is directly represented, the coordinates may be modeled by a distance from one or more origins as a function of an angle relative to the respective origin. Alternatively, in such embodiments the coordinates of the boundary estimate 50 may be modeled by their respective perpendicular distances to a reference boundary or in accordance with any coordinate system, such as Cartesian coordinates system.

It should be noted that the iterative reconstruction algorithm used in the present techniques may be an iterative filtered back projection (IFBP) technique or another iterative reconstruction technique, such as those utilizing algorithms based on maximum a posteriori probability (MAP), maximum likelihood (ML), algebraic reconstruction technique (ART), entropy-based optimization, least squares (LS), penalized weighted least squares (PWLS), statistical reconstruction. These algorithms may employ optimization methods such as Newton-Rhapson iterations, constrained Newton-Rhapson, conjugate gradients, gradient ascent, or stochastic optimization algorithms. Indeed, in general, those iterative reconstruction algorithms known in the art may be employed.

In one embodiment, the iterative image reconstruction process may also incorporate a model of the acquisition physics associated with the acquisition of CT image data. Such an acquisition model may account for such factors as focal spot size, detector cell size, detector point-spread function, azimuthal blur, polychromatic source x-ray spectrum, detector sensitivity, hysteresis, afterglow, lag, detector cross-talk, off-focal radiation, beam hardening, scattered radiation, measurement noise, and detector memory effects.

Further, the iterative image reconstruction algorithm employed may incorporate constraints on one or more parts of the boundary based on prior information. Such prior information may be based on measurements derived by CT or by a non-CT measurement modality such as coordinate measuring machine (CMM), a micrometer, and a laser-based measurement system. Information from other modalities may be included in a variety of ways. For example, the information may be included directly, by constraining or fixing certain parameters. In this embodiment, if CMM data for a part of a boundary is available, after registration, it can be included directly as a constraint on the corresponding boundary parameters. Alternatively, the registration process of the data from the other modality can be incorporated in the boundary estimation process, for instance by formulating it as a parametric estimation of center, rotation angle, and tilt of a known template.

Additionally, the iterative image reconstruction algorithm may incorporate constraints on one or more parts of the boundary based on prior information on smoothness of the boundary. Typically this is implemented by adding a penalty function to the cost function, which penalizes variations from a smooth edge. Also such a smoothness penalty can be incorporated implicitly by imposing regularity conditions on the basis function of the parameterization. In parameterizing the boundary, the numbers of parameters may not be known a priori. Typically, however, the sampling points at a predefined sampling distance may be used. Alternatively, the optimal number of parameters can be estimated from the data by incorporating a model order selection criterion penalty, such as AIC (Akaike information criterion) or MDL (minimum description length), into the cost function formulation. The optimal model order may then be chosen automatically as the one that minimizes the combined cost function. Furthermore, in one embodiment, the iterative image reconstruction algorithm may be based on applying a transformation to a known boundary shape for at least part of the boundary. The transformation may be either a rigid or non-rigid transformation.

As will be appreciated by those of ordinary skill in the art, the attenuation coefficients of the scanned objects in each of the regions may be known or unknown. If they are unknown, they may be estimated as well. This can be done, for instance, by trial and error, or by alternating optimization. After a number of iterations of the boundary based reconstruction, the attenuation coefficients are re-estimated. This process can be repeated multiple times. Optionally, after a number of iterations the system matrix 54 can be recalculated and linearized around a new operating point. This 'relinearization' process can be repeated multiple times.

The boundary based CT reconstruction techniques described in the various embodiments mentioned above may be suited for determining boundaries of piecewise uniform objects, such as a region of substantially uniform attenuation (presumably representing regions of uniform density and/or composition), in an accurate and efficient way. The techniques described above use a relatively sparse model since it only contains boundary coordinates rather than pixel densities representing the entire the object 18. This results in improved computational efficiency as the system matrix is relatively small. Further, as the desired quantity, i.e., the boundary position, is reconstructed directly, errors due to the pixel-representation and the segmentation may be avoided. Additionally, information from other modalities can be incorporated as desired. Furthermore, for sufficiently small system matrices, a direct solution to the perturbed problem may be employed.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for computed tomography (CT) reconstruction, the method comprising:
   initializing a boundary of an object to obtain a boundary estimate;
   defining a forward model based on the boundary estimate;
   linearizing the forward model to obtain a system matrix;
   implementing an iterative image reconstruction process using the system matrix to update the boundary estimate;
   generating an image of the object based on a final boundary estimate; and
   displaying or storing the image for use by a user.

2. The method of claim 1, wherein the boundary corresponds to an edge of a region of substantially uniform attenuation.

3. The method of claim 1, wherein the boundary estimate is represented directly.

4. The method of claim 3, wherein the boundary estimate is defined by at least one spline.

5. The method of claim 4, wherein each spline is a piecewise linear contour represented by a plurality of corner points.

6. The method of claim 4, wherein the at least one spline is of second or higher order.

7. The method of claim 3, wherein the boundary estimate is defined parametrically.

8. The method of claim 7, wherein the boundary estimate comprises a weighted sum of a plurality of basis functions.

9. The method of claim 8, wherein the plurality of basis functions comprise at least one of a harmonic decomposition, a wavelet decomposition and a polynomial expansion.

10. The method of claim 3, wherein the boundary estimate is represented by a plurality of coordinates, wherein the coordinates are modeled by a distance from at least one origin as a function of an angle relative to an axis.

11. The method of claim 3, wherein the boundary estimate is represented by a plurality of Cartesian coordinates.

12. The method of claim 3, wherein the boundary estimate is represented by a plurality of coordinates, wherein the coordinates are modeled by their respective perpendicular distances to a reference boundary.

13. The method of claim 1, wherein the boundary estimate is represented indirectly.

14. The method of claim 13, wherein the boundary estimate is represented using the method of level sets.

15. The method of claim 1, wherein the boundary is initialized based on at least one of a pixel-based reconstruction, at least one contour from a neighboring slice, at least one contour from a previous reconstruction, a CAD model, and an image obtained from at least one non-CT imaging modality.

16. The method of claim 15, wherein the pixel-based reconstruction comprises at least one of a filtered back projection (FBP), an iterative filtered back projection (IFBP), an iterative reconstruction and a statistical reconstruction.

17. The method of claim 15, wherein the at least one non-CT imaging modality comprises at least one of a coordinate measuring machine (CMM), a micrometer, and a laser-based measurement system.

18. The method of claim 1, wherein linearizing the forward model comprises:
    incrementing a plurality of corner points defining the boundary in the respective normal direction by an incremental amount; and
    calculating a response in a measurement domain to generate the system matrix.

19. The method of claim 1, wherein implementing the iterative image reconstruction process comprises at least one of an iterative filtered back projection (IFBP) algorithm, a maximum a posteriori probability (MAP) algorithm, a maximum likelihood (ML) algorithm, an algebraic reconstruction technique (ART) algorithm, an entropy-based algorithm, a least squares (LS) algorithm, a penalized weighted least squares (PWLS) algorithm, a statistical reconstruction algorithm, and an iterative reconstruction algorithm.

20. The method of claim 1, wherein implementing the iterative image reconstruction process comprises directly solving a linearized system of equations to find a boundary perturbation.

21. The method of claim 1, wherein the forward model based on the boundary estimate incorporates a model of the acquisition physics associated with the acquisition of CT image data.

22. The method of claim 21, wherein the model of the acquisition physics models at least one of a focal spot size, a detector cell size, a detector point-spread function, azimuthal blur, a polychromatic source x-ray spectrum, a detector sensitivity, hysteresis, afterglow, lag, detector crosstalk, off-focal radiation, beam hardening, scattered radiation, measurement noise, and detector memory effects.

23. The method of claim 1, wherein the iterative image reconstruction process incorporates constraints on at least a part of the boundary.

24. The method of claim 23, wherein the constraints on at least a part of the boundary are based on data obtained with at least one of a coordinate measuring machine (CMM), a micrometer, and a laser-based measurement system.

25. The method of claim 1, wherein the iterative image reconstruction process is based on applying a rigid transformation to a known boundary shape for at least a part of the boundary.

26. The method of claim 1, wherein the iterative image reconstruction process is based on applying a non-rigid transformation to a known boundary shape for at least a part of the boundary.

27. The method of claim 1, wherein the iterative image reconstruction process incorporates regularization to enforce smoothness of the boundary.

28. A computed tomography (CT) metrology method, the method comprising:
    generating a boundary estimate of an object from a measured sinogram;
    generating a partially calculated sinogram based upon the boundary estimate;
    updating a system matrix based upon the boundary estimate;
    calculating at least one sinogram perturbation from at least one of the system matrix and a set of boundary perturbations;
    adding the partially calculated sinogram and the at least one sinogram perturbation to derive a total calculated sinogram;
    updating the set of boundary perturbations based upon at least one of the measured sinogram, the total calculated sinogram, and the system matrix;
    updating the boundary estimate based upon the set of boundary perturbations;
    generating an image of the object based on a final boundary estimate; and
    displaying or storing the image for use by a user.

29. The method of claim 28, further comprising initializing the system matrix to an initial value.

30. The method of claim 28, further comprising initializing the set of boundary perturbations to an initial value.

31. The method of claim 28, wherein updating the system matrix comprises linearizing a forward model with respect to the boundary estimate.

32. The method of claim 28, further comprising iterating the steps of updating the system matrix, generating the partially calculated sinogram, calculating the at least one sinogram perturbation, adding the partially calculated sinogram and the at least one sinogram perturbation, updating the set of boundary perturbations, and updating the boundary estimate.

33. The method of claim 28, wherein updating the set of boundary perturbations is based upon the total calculated sinogram and the measured sinogram.

34. The method of claim 28, wherein updating the set of boundary perturbations comprises applying at least one of a maximum likelihood algorithm, a maximum a posteriori algorithm, a statistical reconstruction algorithm, a conjugate gradient algorithm, a gradient ascent algorithm, an algebraic reconstruction algorithm, a weighted least squares algorithm, an iterative filtered back projection, an entropy based algorithm, and an iterative reconstruction algorithm.

35. The method of claim 28, wherein generating the partially calculated sinogram and updating the system matrix comprise applying a model of the acquisition physics used to acquire the measured sinogram.

36. The method of claim 35, wherein the model of the acquisition physics accounts for at least one of a focal spot size, a detector cell size, a detector point-spread function, azimuthal blur, a polychromatic source x-ray spectrum, a detector sensitivity, hysteresis, afterglow, lag, detector crosstalk, off-focal radiation, beam hardening, scattered radiation, measurement noise, and detector memory effects.

37. The method of claim 28, wherein updating the set of boundary perturbations is constrained for at least a part of a boundary.

38. The method of claim 37, wherein updating the set of boundary perturbations is constrained for at least a part of the boundary based on information from a non-CT modality.

39. The method of claim 28, wherein updating the set of boundary perturbations accounts for prior information on smoothness of a boundary.

40. The method of claim 28, wherein updating the set of boundary perturbations comprises applying a rigid or non-rigid transformation to a known boundary shape for at least a part of a boundary.

41. The method of claim 28, wherein the boundary estimate is represented indirectly.

42. The method of claim 41, wherein the boundary estimate is represented using the method of level sets.

43. The method of claim 28, wherein the boundary estimate is represented directly.

44. The method of claim 43, wherein the boundary estimate is defined parametrically.

45. The method of claim 44, wherein the boundary estimate comprises a weighted sum of a plurality of basis functions.

46. The method of claim 45, wherein the plurality of basis functions comprise at least one of a harmonic decomposition, a wavelet decomposition and a polynomial expansion.

47. The method of claim 43, wherein the boundary estimate is defined by at least one spline.

48. The method of claim 47, wherein each spline is a piecewise linear contour represented by a plurality of corner points.

49. The method of claim 47, wherein the at least one spline is of second or higher order.

50. A computed tomography (CT) metrology system comprising:
a source for emitting radiation;
a controller configured to operate the source;
an array of detector units configured to detect radiation transmitted through the object and to generate a detector output signal in response to the detected radiation;
data acquisition circuitry for acquiring the detector output signal;
an image reconstructor coupled to the data acquisition circuitry for generating an image signal in response to the detector output signal, wherein the image reconstructor is configured to initialize a boundary of an object to obtain a boundary estimate, to define a forward model based on the boundary estimate, to linearize the forward model to obtain a system matrix, and to implement an iterative image reconstruction process using the system matrix to update the boundary estimate; and
a computer for controlling the operation of at least one of the controller, the data acquisition circuitry and the image reconstructor.

51. The computed tomography (CT) metrology system of claim 50, wherein the image reconstructor linearizes the forward model by:
incrementing a plurality of corner points defining the boundary in the respective normal direction by an incremental amount; and
calculating a response in a measurement domain to generate the system matrix.

52. A computed tomography (CT) metrology system comprising:
a source for emitting radiation;
a controller configured to operate the source;
an array of detector units configured to detect radiation transmitted through the object and to generate a detector output signal in response to the detected radiation;
data acquisition circuitry for acquiring the detector output signal;
an image reconstructor coupled to the data acquisition circuitry for generating an image signal in response to the detector output signal, wherein the image reconstructor is configured to generate a boundary estimate of an object from a measured sinogram, to update a system matrix based upon the boundary estimate, to generate a partially calculated sinogram based on the boundary estimate, to calculate at least one sinogram perturbation from at least one of the system matrix and a set of boundary perturbations, to add the partially calculated sinogram and the at least one sinogram perturbation to derive a total calculated sinogram, to update the set of boundary perturbations based upon at least one of the measured sinogram, the total calculated sinogram, and the system matrix, and to update the boundary estimate based upon the set of boundary perturbations; and
a computer for controlling the operation of at least one of the controller, the data acquisition circuitry and the image reconstructor.

53. The computed tomography (CT) metrology system of claim 52, wherein the image reconstructor is configured to initialize the system matrix to an initial value.

54. The computed tomography (CT) metrology system of claim 52, wherein the image reconstructor is configured to initialize the set of boundary perturbations to an initial value.

55. The computed tomography (CT) metrology system of claim 52, wherein the image reconstructor updates the system matrix by linearizing a forward model with respect to the boundary estimate.

56. The computed tomography (CT) metrology system of claim 52, wherein the image reconstructor is configured to iterate the steps of updating the system matrix, generating the partially calculated sinogram, calculating the at least one sinogram perturbation, adding the partially calculated sinogram and the at least one sinogram perturbation, updating the set of boundary perturbations, and updating the boundary estimate.

57. A, tangible, machine readable media, comprising:
 code adapted to initialize a boundary of an object to obtain a boundary estimate;
 code adapted to define a forward model based on the boundary estimate
 code adapted to linearize the forward model to obtain a system matrix; and
 code adapted to implement an iterative image reconstruction process using the system matrix to update the boundary estimate.

58. A tangible, machine readable media, comprising:
 code adapted to generate a boundary estimate of an object from a measured sinogram;
 code adapted to update a system matrix based upon the boundary estimate;
 code adapted to generate a partially calculated sinogram based on the boundary estimate;
 code adapted to calculate at least one sinogram perturbation from at least one of the system matrix and a set of boundary perturbations;
 code adapted to add the partially calculated sinogram and the at least one sinogram perturbation to derive a total calculated sinogram;
 code adapted to update the set of boundary perturbations based upon at least one of the measured sinogram, the total calculated sinogram, and the system matrix; and
 code adapted to update the boundary estimate based upon the set of boundary perturbations.

59. The tangible, machine readable media of claim 58, further comprising code adapted to initialize the system matrix to an initial value.

60. The tangible, machine readable media of claim 58, further comprising code adapted to initialize the set of boundary perturbations to an initial value.

61. A computed tomography (CT) metrology system comprising:
 means for initializing a boundary of an object to obtain a boundary estimate;
 means for defining a forward model based on the boundary estimate
 means for linearizing the forward model to obtain a system matrix; and
 means for implementing an iterative image reconstruction process using the system matrix to update the boundary estimate.

62. A computed tomography (CT) metrology system comprising:
 means for generating a boundary estimate of an object from a measured sinogram;
 means for updating a system matrix based upon the boundary estimate;
 means for generating a partially calculated sinogram based on the boundary estimate;
 means for calculating at least one sinogram perturbation from at least one of the system matrix and a set of boundary perturbations;
 means for adding the partially calculated sinogram and the at least one sinogram perturbation to derive a total calculated sinogram;
 means for updating the set of boundary perturbations based upon at least one of the measured sinogram, the total calculated sinogram, and the system matrix; and
 means for updating the boundary estimate based upon the set of boundary perturbations.

* * * * *